May 13, 1969 KOYA KIMURA 3,444,542
APPARATUS FOR DETECTING DISTANCE OF LINEAR MOVEMENT

INVENTOR.
Koya KIMURA

INVENTOR.
Koya KIMURA

United States Patent Office 3,444,542
Patented May 13, 1969

3,444,542
APPARATUS FOR DETECTING DISTANCE OF LINEAR MOVEMENT
Koya Kimura, Numazu-shi, Japan, assignor to Toshiba Kakai Kabushiki Kaisha, Tokyo-to, Japan
Filed May 16, 1966, Ser. No. 550,454
Claims priority, application Japan, May 28, 1965, 40/31,446
Int. Cl. G08c 21/00
U.S. Cl. 340—196
5 Claims

ABSTRACT OF THE DISCLOSURE

An apparatus for detecting of linear movement. A precision reference screw has a pair of solenoid coils concentrically wound around it to generate an electrical signal corresponding to the relative movement between the screw and solenoid coils. The screw is divided into a plurality of screw elements along its longitudinal axis which are assembled to form an integral screw of the desired length, whereby the error condition of the precision screw as a whole can be adjusted.

---

This invention relates to apparatus for detecting linear movement, and more particularly to apparatus for electrically detecting distance of linear movement.

In an automatic control device for machine tools it is required to produce an electric quantity or signal proportional to the distance of linear movement of certain parts of the machine tool. In one prior arrangement for detecting distance of linear movement, a precision screw, a pair of solenoid coils wound around the screw, and means to effect relative movement between the screw and solenoid coils are provided. The solenoid coils are connected in an electrical bridge circuit to obtain an electrical signal proportional to the distance of relative movement between said coils and screw. However, in such a prior apparatus there is the difficulty of the accumulated pitch error or the maximum accumulated pitch error of the screw appearing as a detection error of the detector, and there has been no effective means to eliminate such error.

It is therefore the principal object of this invention to provide a simple and effective means to eliminate or greatly reduce the detection error of the detector caused by the error of a screw acting as the reference element of the detector.

Briefly stated, the apparatus for detecting distance of linear movement of the invention comprises a precision screw serving as a reference element, a pair of solenoid coils concentrically wound around said screw, means to effect relative axial movement between said screw and said coils and means to derive from said coils an electrical signal corresponding to said relative movement. According to this invention, the precision screw is divided into a plurality of screw elements along the longitudinal axis thereof and these screw elements are fabricated into an integral screw of the desired length whereby the error condition of the precision screw as a whole is adjusted.

For a complete understanding of this invention reference may be had to the following detailed explanations in connection with the accompanying drawings in which.

Figure 1:
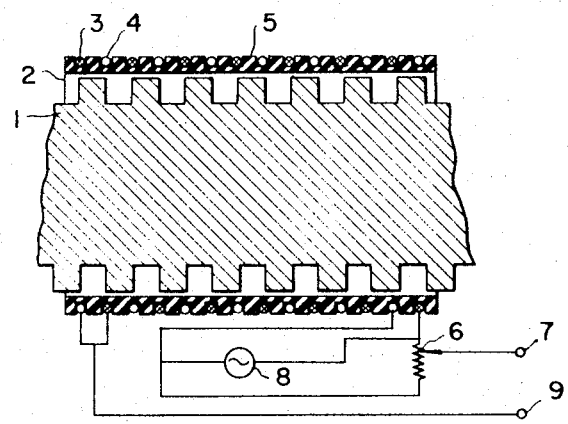
FIG. 1 shows longitudinal sectional view of a portion of a precision screw and electric circuit associated therewith of a prior apparatus for detecting distance of linear movement.

Firstly with regard to a prior apparatus for detecting distance of linear movement, the reference numeral 1 in FIG. 1 represents a precision screw serving as a reference scale of the detector. The screw 1 is inserted in a bobbin 2 of a solenoid coil which are arranged to make free axial relative movements. The screw is suitably supported at its opposite ends so that it can be fixed at any position after it has been rotated about its axis by any desired angle. Means to support the opposite ends of the screw and a driving mechanism therefor are not shown in the drawing since they are immaterial to this invention.

When the screw 1 has a single screw thread of a pitch $Pmm$, the periphery of the bobbin 2 is provided with double screw threads having a pitch of $\frac{1}{2}$ $Pmm$ and a lead of $Pmm$. The bobbin 2 is made of an electrical insulator or a metal covered by an electric insulator. Two independent electric wires are received in two screw threads provided on the outer periphery of the bobbin 2 to form two solenoid coils 3 and 4. Since the solenoid coils 3 and 4 and the bobbin 2 constitute a unitary structure, for convenience, they will be referred to hereinafter as a "detector coil 5."

As shown in FIG. 1 these solenoid coils 3, 4 and a potentiometer 6 are connected in an electrical bridge circuit energized from a source of alternating current 8. Electrical outputs are taken out from the bridge circuit through a terminal 7 of the potentiometer and the common terminal 9 of the solenoid coils 3 and 4 and are then rectified by a suitable means to provide electrical output signals having polarities and magnitudes corresponding to the directions and magnitudes of relative axial displacements between the screw thread of the screw 1 and the solenoid coils 3 and 4. Thus, the device shown in FIG. 1 can be utilized as a detector of linear displacements, physical characteristics of such a detector being discussed in detail on page 525 and following pages of vol. 2, No. 7 of a periodical, "Measurements and Controls," published by the Society of Measurements and Automatic Controls in Japan.

As is discussed in said paper, practical problems of this detector are that the accumulated pitch error or the maximum accumulated pitch error of the screw 1 directly appears as an error of the detector and that there is no effective means to eliminate such error.

Figure 2:
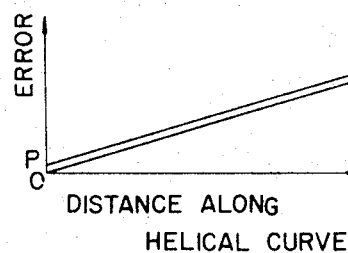
FIG. 2 is a graph to explain the relation between the mechanical error of the precision screw and the position detection error of a detector utilizing the precision screw as the reference for detection.

This can be readily understood by considering FIG. 2 of the accompanying drawing which shows a graph illustrating the relation between the distance measured from one point on the screw thread along the helical curve thereof and the accumulated value of the pitch error, a typical example of the accumulation of the pitch error being represented by a straight line OA.

When the screw 1 has an accumulated error as shown by the straight line OA, the error of the detector of the type described above will be represented by a straight line PB, and the accumulated error will be similar to the mechanical error of the screw 1 for the reason described hereunder.

More particularly, as the output of the detector is produced as a result of the action of the electric field or magnetic field created by the solenoid coils 3 and 4 upon the screw 1, it may be considered that the error of detection is determined essentially by the average value of errors presenting in the screw 1 which is under the action of the solenoid coils 3 and 4. This relation can be represented by the following equation.

$$E = K \int_0^L F ds \qquad (1)$$

where E represents the error voltage in volts, K a constant, L the expanded length in centimeters of the solenoid coil 3 or 4, and F the difference between the error Fs in centimeters of the screw 1 and the error Fc in centimeters of the solenoid coil, said difference being expressed by the following equation. Although it is assumed herein that quantities F, Fs and Fc are very small, Equation 1 holds true in precision screws.

$$F = Fs - Fc \qquad (2)$$

Further, S represents the length of a curve which is measured along the center line of the electric wire forming the solenoid coil. In this case it is assumed that $S=0$ at one end of the solenoid coil. Fs represents a function of a length $x$ when measured along a helical curve representing the screw surface, taking one end of the screw 1 as the origin, and Fc is a function of said length S.

When the coil 5 and the screw 1 are displaced relatively by $\delta$ (in centimeters) in order to make zero the error voltage represented by equation, this displacement $\delta$ represents the detection error which is given by the following equation.

$$O = K \int_0^L (F - \delta) ds \qquad (3)$$

Since $\delta$ is a constant in the integrand, by calculating this equation the following Equation 4 can be obtained $$\delta = \frac{1}{L} \int_0^L F ds \qquad (4)$$

From Equations 2 and 4, the following expression is obtained $$\delta = \frac{1}{L} \int_0^L Fs \, ds - \frac{1}{L} \int_0^L Fc \, ds \qquad (5)$$

By denoting the first term on the right hand side of this equation by $\delta s$ and the second term by $\delta c$, it can be considered that $\delta c$ is a constant inherent in the detector coil and not a function of the position of the coil. Therefore, it is possible to use this detector to measure the distance of linear movement. In other words, since $\delta c$ is independent of the detection error which appears when the distance of linear relative movement between the screw 1 and the coil 5 is being detected, it is sufficient to consider $\delta s$ only as the detection error which is expressed by the following equation.

$$\delta s = \frac{1}{L} \int_0^L Fs \, ds \qquad (6)$$

Where the error Fs is represented by a straight line such as a line OA, in FIG. 2, the value of $\delta s$ can be calculated in the following manner.

In this case, Fs is given by the following equation as a function of $x$ $$Fs = mx \qquad (7)$$

where $m$ is a constant representing the percentage of the accumulated error, and according to Equation 6, $\delta s$ is given by $$\delta s = \frac{1}{L} \int_x^{x+L} Fs \, dx \qquad (8)$$

From Equations 7 and 8, the following expression is obtained.

$$\delta s = \frac{1}{L} \int_x^{x+L} mx \, dx$$

$$= \frac{m}{2L} \{(x+L)^2 - x^2\}$$

$$= \frac{m}{2L} (2 \times L + L^2)$$

$$= mx + \frac{mL}{2} \qquad (9)$$

The value of $\delta c$ expressed by Equation 9 is represented by a straight line PB in FIG. 2, and since the second term on the right hand side of Equation 9 is constant, it can be neglected when evaluating $\delta c$ for the same reason mentioned above. Thus, it will be clear that it is possible to consider Fs expressed by Equation 7 and $\delta s$ expressed by Equation 9 as being quite identical, which shows that with the detector of the type referred to above, it is impossible to completely eliminate the accumulated error inherent in the screw 1.

This invention contemplates eliminating or greatly reducing the detection error due to the error of the screw 1 which constitutes the reference element for detection by the use of a very simple yet effective means.

More specifically, it is a feature of this invention to utilize a screw assembled from a number of screw elements of suitable short length instead of a screw 1 of integral construction as shown in FIG. 1. For convenience, such a screw assembly will be referred to hereinafter as the assembled type screw.

Figure 5:
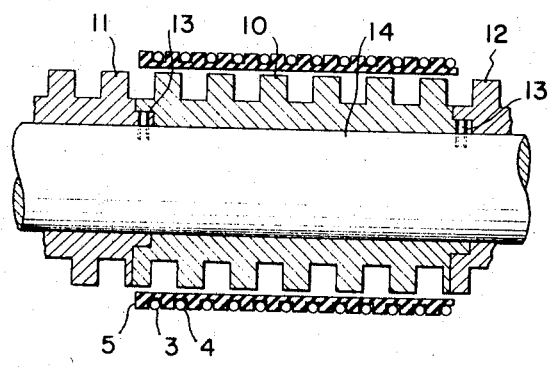
FIG. 5 is a longitudinal sectional view of a portion of one embodiment of this invention.

Referring to FIG. 5 which shows a longitudinal cross-section of a portion of a detector screw embodying this invention, there is shown an assembled type screw comprising a plurality of screw elements 10, 11 and 12 which are fixed to a screw shaft 14 by means of independent set screws 13. The assembled type screw shown in FIG. 5 is characterized in that it is assembled into a unitary structure to a total length required for use as a detector reference screw by adjustably mounting a plurality of screw elements of suitable length around and along a boring shaft 14, for example, or other movable portion of machine tools. As shown in FIG. 5, a coil 5 including a pair of solenoid coils 3 and 4 is disposed to concentrically surround the screw. The axial length of the coil is equal to the axial length of one screw element.

Figure 6:
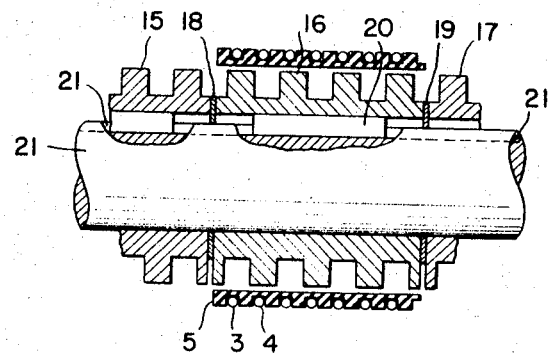
FIG. 6 is a similar view showing another embodiment of this invention.

FIG. 6 illustrates another embodiment of this invention comprising a number of screw elements 15, 16 and 17 which are spaced from each other by means of spacers 18 and 19 and are keyed to a screw shaft 21 by keys 20 received in key ways 22. Although not shown in the drawing, the screw elements are urged in the longitudinal direction to engage each other by suitable adjustable screws provided on the opposite ends of the assembly. Thus, in the assembled type screw shown in FIG. 6, each of the screw elements is prevented from rotating in the circumferential direction but are slidable longitudinally so that a detector reference screw of the required axial length can be readily obtained by combining a required number of screw elements and spacers. In this case also, the assembled type screw shown in FIG. 6 is combined with a coil 5 having the same axial length as one screw element.

Figure 3:
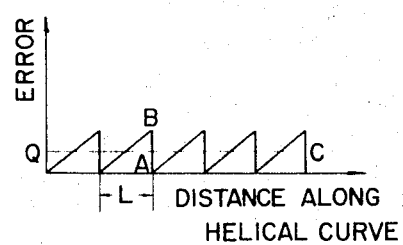
FIG. 3 is a graph to explain the relation between the mechanical error of the precision screw constructed in accordance with this invention and the position detection error of a detector utilizing the novel precision screw.

With either construction shown in FIG. 5 or 6, it is very simple and easy to adjust the relative position of screw elements to provide an error condition to be described later. More particularly, if respective screw elements were made to have the same axial length (L cm.)

and the same error, it would be possible to provide an overall saw-tooth shaped error curve as shown in FIG. 3 for the assembled type screw by adjusting the relative position of respective screw elements and then fixing them at the adjusted positions. In other words irrespective of how long the length of the helical curve may be, the maximum value of the accumulated error is limited to the height AB of a saw-tooth, and it is easy to cause the error curve to have a configuration of a recurrent curve having a pitch of L centimeters. The following merits can be attained by combining a solenoid 3 or 4 of the detector coil 5 having an axial length of L centimeters with said assembled type reference screw.

As described before with regard to the detector error, Equations 4, 5, and 6 were derived, of which Equation 6 is the most important. Since Fs is represented by the saw-tooth curve shown in FIG. 3, the value of δs calculated according to Equation 6 is constant and is equal to AB/2 regardless of the position of the integrated section L along a helical curve. Thus, the detector error δ will be represented by a straight line QC in FIG. 3.

Again in this case δc can be neglected for the same reason as stated with regard to the evalution of δc in Equation 5, so that the overall error of the detector is substantially zero notwithstanding the fact that the reference detector elements contain error. Thus, this invention readily provides extremely accurate detectors at low cost.

Practically, the effect of joints between adjacent screw elements can be ignored for the following reason.

The partially incomplete state of the discontinuous condition of the thread at the joint which is caused by incorrect machining and other reasons can be mathematically expressed as follows. In the above Equation 6, if it is assumed that the error Fs of the screw increases by an abnormal value gs for a short length l corresponding to the length of the joint between adjacent screw elements, then the effect of error Fs can be inferred by considering the effect of the value gs upon the entire screw. The effect δs′ of the joint is given by $$\delta s' = \frac{1}{L} \int_0^1 gs \, ds \qquad (10)$$

If we represent the maximum absolute value of gs by G, since $$G \leq |gs| \qquad (11)$$

$$|\delta s'| \leq \frac{1}{L} \int_0^1 G \, ds \qquad (12)$$

However, because G is a constant in the integrand, we obtain by integrating Equation 12, $$|\delta s'| = \frac{l}{L} G \qquad (13)$$

Although the absolute value of the effect caused by the joint does not exceed the value of the right hand side of Equation 13, since the length l of the joint l is sufficiently smaller than the total length L, we obtain the following equation $$\frac{l}{L} \ll 1 \qquad (14)$$

Equation 14 shows that the value of the right hand side of Equation 13 is sufficiently small. For example, in the case of a solenoid having a total of 40 turns, if the length of the joint is equal to the spacing between adjacent turns, the detector error will be only l/L or 1/40 times the error of the joint. Thus the effect δs′ caused by the joint is very small when compared with the total error δs and, hence, can be neglected.

The following tables shows the result of an experiment carried out by the inventor on the effect of the joint. From this result it will be noted that the effect of the joint cannot be detected for an assembled type screw having a construction as shown in FIG. 5 and following dimensions.

Outside diameter of the screw element _____mm__ 55
Axial length of one screw element _____mm__ 100
Screw pitch _____mm__ 2
Height of the screw thread (square screw) __mm__ 1
Inside diameter of the solenoid _____mm__ 55.5
Number of turns of one solenoid _____ 40

Further, in this case piano wires of 0.5 mm. diameter were wrapped around various portions of the screw element for a range of one pitch each and the effect of each piano wire was measured. However, it was determined that the error caused by such an effect was only four microns and can be neglected.

The above described theory and experiment prove that any error in any portion of the detector screw 1 does not result in any appreciable effect upon the detection error. Thus, imperfect thread portions at opposite ends of respective screw element of the assembled type screw or adjusting spacers 18 and 19 employed in the modification shown in FIG. 6 do not cause any undesirable effect.

Figure 4:
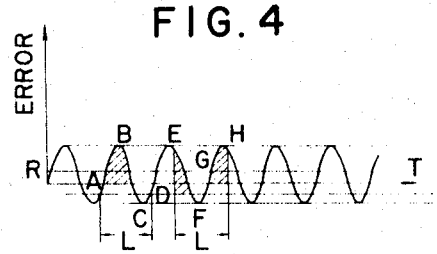
FIG. 4 is a graph to explain the relation between another form of mechanical error of the precision screw according to this invention and the position detection error of a detector utilizing the same as the reference of detection.

Although the above description is directed to a case wherein the error curve is in the form of a simple saw-tooth curve, it should be understood that this invention is not limited to such a special case. For example, even when the error curves of respective screw elements are of more complicated configuration, the object of this invention can be attained provided that all screw elements are made to have the same error curve of the same configuration and the same length, that the axial length of respective screw elements and that of the solenoid coil are equal, and that the screw elements are assembled into a single detecting screw to provide a recurring error curve as shown in FIG. 4. If the length of any section along the abscissa of such a recurring curve is equal to the axial length of the thread of the respective screw element, the area defined by any particular section of the abscissa and the error curve, that is the shaded area ABCD or EFGH, FIG. 4, is constant and the mean value of the error of these portions can be calculated by dividing said area by the length L of the section. Similarly as in the case shown in FIG. 3, the detection error in this case can be represented by a straight line RT, which means that detection error is constant. With such a detector, there is no appreciable detection error as has been described hereinabove in connection with FIG. 3.

Although the above description refers to a particular case wherein the axial length of respective screw elements is equal to the axial length of the solenoid coil, if, for some practical reason, it is impossible to satisfy the above stated relation between lengths, it is possible to decrease the accumulated error of the detector screw as a whole by dividing the screw into a plurality of screw sections according to the principle of this invention, then adjusting the relative position of the screw elements, and finally fixing the screw elements in the adjusted positions, thus forming an assembled type screw. With this arrangement, the cyclic error of the assembled type screw, which recurs at a frequency or pitch equal to the length of the detector solenoid is further decreased, whereby a detector having extremely high accuracy is provided.

While the invention has been shown and described in connection with some preferred embodiments thereof, it should be understood that this invention is not limited thereto and includes all modifications and alternations as fall within the true spirit and scope of this invention.

What is claimed is:

1. Apparatus for detecting distance of linear movement comprising a precision screw serving as a reference element, a pair of solenoid coils concentrically wound around said screw, means to effect relative axial movement between said screw and said coils, means to derive from said coils an electrical signal corresponding to said relative axial movement, said screw being divided into a pluralty of screw elements along the longitudinal axis thereof, and means to assemble said screw elements to form an integral screw of the desired length whereby the error condition of the precision screw as a whole can be adjusted.

2. The apparatus for detecting distance of linear movement according to claim 1, wherein each of said screw sections is fixed to a common shaft by means of a set screw.

3. The apparatus for detecting distance of linear movement according to claim 1, wherein each of said screw sections is mounted on a common shaft by means of a key.

4. The apparatus for detecting distance of linear movement according to claim 1, wherein an adjusting member is interposed between adjacent screw elements.

5. The apparatus for detecting distance of linear movement according to claim 1, wherein each of said solenoid coils has the same axial length as one of said screw elements.

References Cited

FOREIGN PATENTS 954,893  4/1964  Great Britain.

THOMAS B. HABECKER, *Primary Examiner.*

U.S. Cl. X.R.

336—30, 212

PO-1050
(5/69)

UNITED STATES PATENT OFFICE
CERTIFICATE OF CORRECTION

Patent No. 3,444,542          Dated May 13, 1969

Inventor(s) KOYA KIMURA

It is certified that error appears in the above-identified patent and that said Letters Patent are hereby corrected as shown below:

In the heading of the patent, in the name of the assignee corporation, change "Kakai" to --Kikai--.

SIGNED AND
SEALED
OCT 28 1969

(SEAL)
Attest:

Edward M. Fletcher, Jr.
Attesting Officer

WILLIAM E. SCHUYLER, JR.
Commissioner of Patents